INVENTOR
Raymond L. Kuehn
By
ATTORNEY

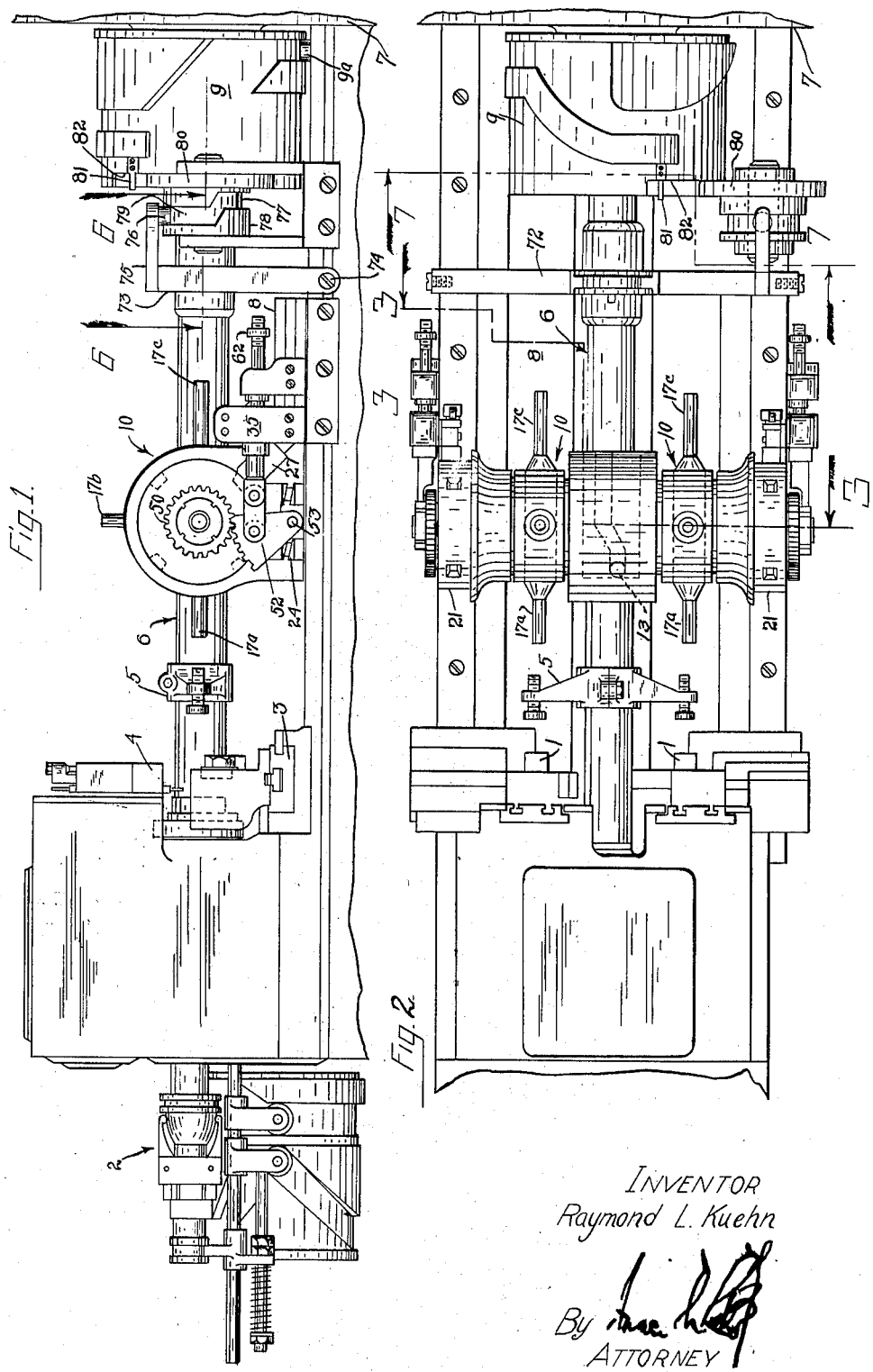

June 22, 1943.  R. L. KUEHN  2,322,525
MACHINE TOOL
Filed July 14, 1941  3 Sheets-Sheet 3
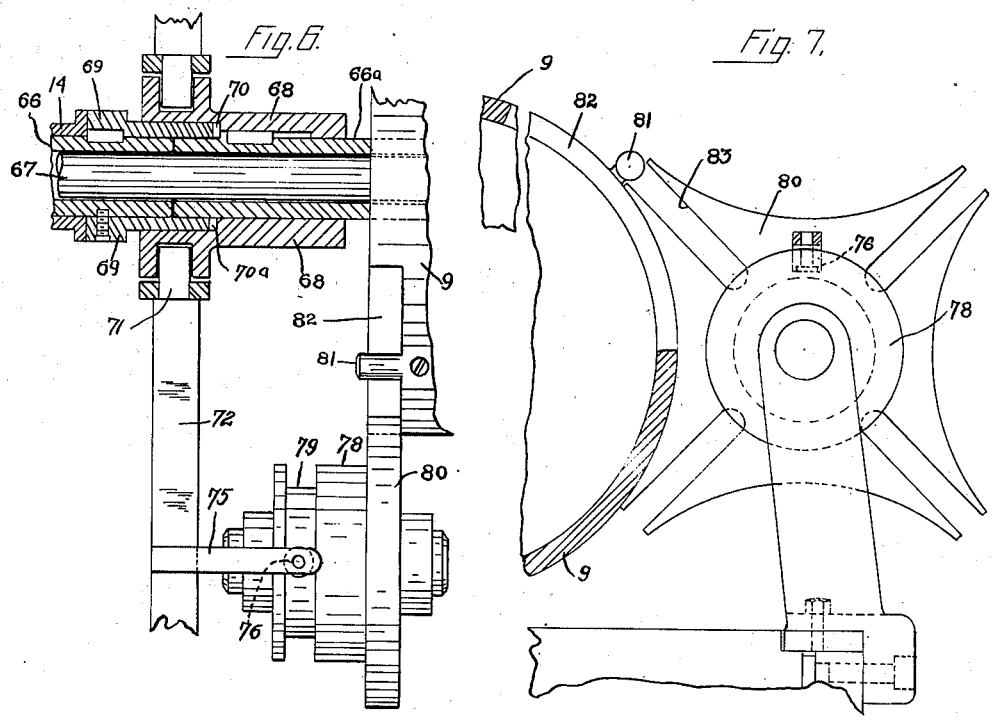
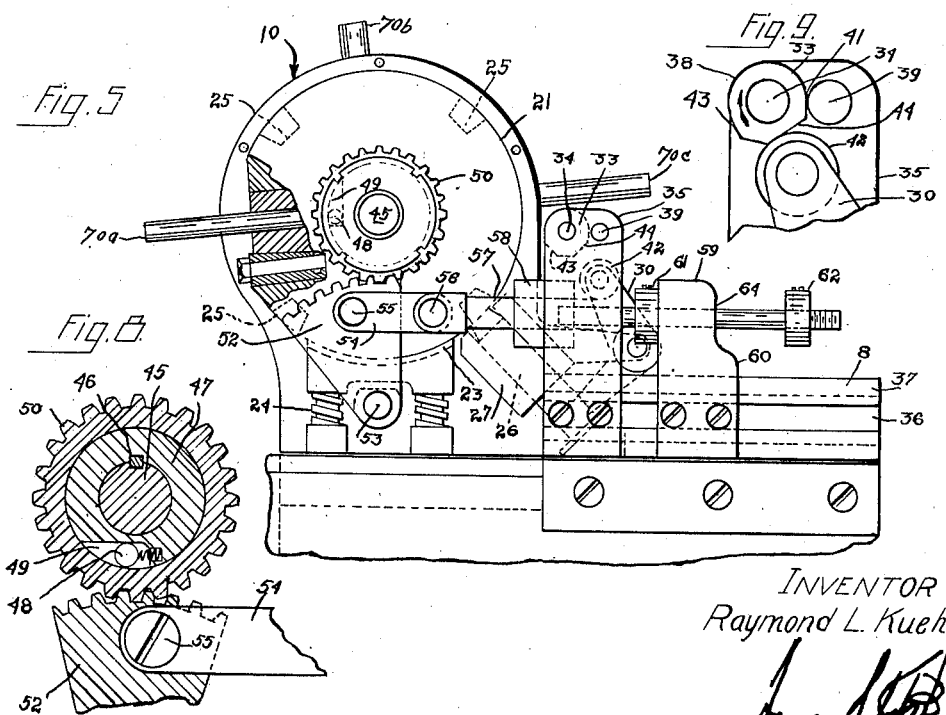
INVENTOR
Raymond L. Kuehn
By
ATTORNEY Patented June 22, 1943

2,322,525

UNITED STATES PATENT OFFICE 2,322,525

MACHINE TOOL

Raymond L. Kuehn, Hartford, Conn., assignor to The Billings & Spencer Company, a corporation of Connecticut Application July 14, 1941, Serial No. 402,303

6 Claims. (Cl. 29—36)

My invention relates to machine tools.

It has among its objects to provide an improved machine tool of the so-called two-at-a-time type, and, more particularly, to provide such a machine having improved tool indexing mechanism on the longitudinal tool carrier thereof, whereby the number of tools carried on this carrier may be materially increased and these tools may be indexed into a plurality of operative positions in such manner as materially to increase the field of usefulness of such machines. A further object of my invention is to provide turret mechanism of an improved construction and operated by improved mechanism in an improved manner as the longitudinal tool slide is operated. A still further object of my invention is to provide improved controlling mechanism whereby, while the turret mechanism is in operation and indexed as desired, the operation of the stock feeding and stopping mechanisms and of the forming tools and cut-off tools is so controlled as to enable the same to operate in improved timed relation with the multiple position turret mechanism on the longitudinal tool carrier. Other objects and advantages of my improved construction will also hereinafter more fully appear.

In the accompanying drawings, I have shown for purposes of illustration one embodiment which my invention may assume in practice.

In these drawings—

Figure 1 is a side elevation of the illustrative machine, certain parts being broken away to facilitate illustration and the machine being shown in fully retracted position of the longitudinal tool carrier;

Fig. 2 is a plan view of the machine shown in Figure 1, the stock feeding and gripping mechanism also being broken away to facilitate illustration;

Fig. 5 is a like view on a slightly larger scale, showing the indexing mechanism approaching the opposite limit of its travel;

Fig. 6 is a section on line 6—6 of Figure 1, showing the clutch and controlling cam mechanism;

Fig. 7 is an enlarged sectional view on line 7—7 of Figure 2, of the operating mechanism for the clutch controlling cam;

Fig. 8 is an enlarged detail sectional view on line 8—8 of Figure 3, and

Fig. 9 is an enlarged detail of the lock operating cam.

Figure 3:
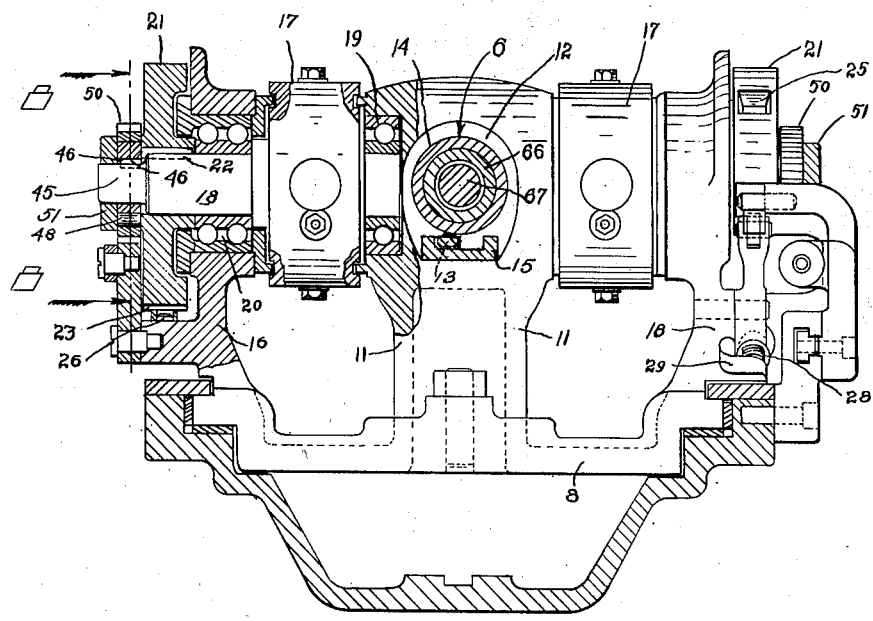
Fig. 3 is an enlarged vertical sectional view on line 3—3 of Figure 2.

In this illustrative construction, I have shown my invention as applied to use in connection with a well-known form of two-at-a-time machine such, for example, as that described and claimed in the Elmer E. Kelley application, Serial No. 364,533, filed November 6, 1940. As shown in that application, the machine herein includes a plurality of parallel work rotating spindles 1 having associated work gripping and feeding mechanism, generally indicated at 2, and transverse tool slide mechanism, generally indicated at 3, and vertical cut-off mechanism, generally indicated at 4, all adapted to operate in a well-known sequence and to cooperate with swinging stock stop arm mechanism 5 carried on tubular drive shafting 6 from gearing in a usual gear box 7, while a longitudinally reciprocable tool carrier, generally indicated at 8, is reciprocated in timed relation therewith by a rotatable main cam 9 on the machine frame cooperating with a usual roller 9a on the rear end of the carrier 8. My improvements herein comprise improved multiple position double turret mechanism, generally indicated at 10 and carried on the tool carrier 8, together with improved indexing mechanism for this turret mechanism, and improved means which control the operation of the work gripping and feeding mechanism, the transverse tool slide and the vertical cut off mechanisms relative to this indexing mechanism, all as hereinafter more fully described.

Referring more particularly to the turret mechanism 10, it will be noted that herein the longitudinal tool carrier 8 has an upstanding central portion 11 at its front end, and that the shafting 6 extends through and rotates freely in a central aperture 12 in this portion 11; a roller 13 herein being provided on the outer tubular shaft 14 and cooperating with a usual relatively stationary cam 15, herein carried on the portion 11, to effect oscillation of the stock stop 5 into and out of operative position in a usual manner. It will also be observed that this longitudinal tool carrier 8 has upwardly extending journal supporting members 16 on its opposite ends spaced laterally from the portion 11 on each side thereof and cooperating therewith to provide journals for like turrets 17 on opposite sides of the shafting 6. Herein, each of these turrets carries four tools, three of which are diagrammatically indicated at 17a, 17b, and at 17c, and spaced by 90° from each other, and suitably fixed in the turrets, as for example by wedging means shown in Figures 4 and 5. Further, it will be noted that each turret is herein fixed to a short shaft 18 journalled in suitable bearings 19 and 20 in the members 11 and 16; the shafts 18 terminating short of the shafting 6 at their inner ends and projecting outward through the member 16 at their opposite ends which are, in turn, connected to improved turret indexing mechanism hereinafter described.

Herein, the turrets 17 are maintained in their various operative positions by improved cooperating braking and locking mechanisms automatically controlled as the turrets are moved reversely longitudinally on the longitudinal tool carrier 8. As shown, each shaft 18 has a locking and braking drum 21 fixed thereto outside the bearing 20, these drums being preferably keyed to the shafts, as at 22. Further, a concave brake shoe 23 acts upon the bottom of each drum 21 and is normally pressed into sufficient braking engagement therewith, herein by springs 24 carried on the longitudinal tool carrier 8, to tend to hold the drum and turret in their different desired positions while permitting movement by the indexing mechanism. As illustrated, each of these drums 21 is also provided with four radially located equally spaced notches 25 adapted to receive a locking pin or member 26 reciprocable in a suitable bracket 27 on the carrier 8 and herein disposed angularly adjacent the latter and the brake shoe 23. Each locking pin 26 is normally projected into locking position by a coiled spring 28 acting between the pin and an abutment 29 on the carrier 8, while a bell crank lever 30, pivoted at 31 on a bracket 32 on the carrier frame, is operated to retract and release its locking pin 26. As shown, each lever 30 is also automatically operated by engagement with a cam 33 mounted for limited rotation on a pin 34 on the top of an upstanding bracket 35 adjustably mounted in guides 36 on a member 37 fixed to the stationary bed frame of the machine. Herein, this cam 33 has on its top a semi-round surface 38 movable freely by a like surface on an adjacent cooperating pin 39 parallel to the pin 34 and also carried by bracket 35, while the cam 33 also has a short flat surface 41 below one end of the surface 38, and like oppositely disposed inclined faces 43, 44 on the lower portion of the cam. Thus, the surface 41 is adapted to engage the pin 39 and hold the cam 33 against counterclockwise rotation when the bell crank 30 moves rearwardly and the roller 42 on the upper arm of the bell crank then engages the sloping face 43, while clockwise rotation of the cam 33 is permitted when the bell crank is moving forward, since the roller 42 then engages the opposite face 44. Accordingly, when the bell crank 30 is movable rearwardly with carrier 8 over the bed frame, the roller 42 on the upper arm of the bell crank will engage the cam surface 43, and due to the engagement of the flat face 41 with the pin 39, the bell crank will be swung counterclockwise from the position shown in Figure 4 in such manner as to retract the pin 26 as the roller 42 passes under the cam 33; the pin then remaining retracted as its end rides over the surface of the drum 21 between the notches 25 during the indexing of the turrets, hereinafter described. On the other hand, when the bell crank 30 is moved forwardly with the longitudinal tool carrier 8, its roller 42 will pass freely under the cam 33, which is then free to rotate clockwise as shown in Figure 9, in such manner as to permit the coiled spring 28 to seat the pin 26 in the next notch 25 as soon as the latter comes opposite the pin.

Cooperating with each of the above mechanisms for locking and unlocking the drums 21, is also improved clutch mechanism for each turret 17; herein connected between each turret and improved indexing mechanism for the turrets hereinafter described. As shown, each shaft 18 has a reduced portion 45 on its outer extremity keyed as at 46 to an inner clutch element 47. Further, a spring pressed roller 48 movable in a tapered slot 49 in the periphery of the member 47 moves automatically into and out of clutching engagement with an outer clutch member 50, herein in the form of a turret indexing gear, as this gear 50 is rotated in opposite directions by the indexing mechanism as hereinafter described. Both the clutch members 47 and 50 are herein longitudinally positioned on the extremity 45 of the shaft by a collar 51 suitably fixed to the shaft. Thus, when the outer clutch member or gear 50 is rotated in a clockwise direction, this member 50 will be fixed to and rotate the cooperating clutch member 47, and rotate with it the shaft 18 with its attached drum 21 and turret 17, while when the gear 50 is rotated in the opposite direction, these clutch members will be disconnected in such manner as to enable the turret to be held stationary during this reverse rotation of the gear 50 by the action of the locking pin 26 and shoe 23 on each drum 21.

Operatively connected to each of the indexing gears 50 is improved operating and controlling mechanism therefor. Herein, this mechanism includes an upright toothed sector 52 having its upper toothed edge meshing with the teeth of the gear 50 and its lower end pivoted at 53 on a transverse axis directly below the axis of the shaft 18. As shown, this sector 52 is operated by a short rearwardly extending link 54 pivoted to the upper end of the sector at 55 and pivotally connected at its rear end by a pin 56 to an operating rod 57 longitudinally reciprocable in a bearing 58 carried on the longitudinal tool slide 8 and another rearwardly located bearing 59 carried on an adjustable bracket member 60 in rear of the bracket member 35 and similarly adjustable in the guides 36 on the stationary bed frame of the machine. As shown, this operating rod also has a reduced rear end carrying collars 61 and 62 spaced therefrom and adapted respectively to engage a front flat face 63 and a like rear face 64 on the bracket 60 at the opposite limits of the travel of the operating rod 57 which also are the opposite limits of angular movement of the sector 52. Thus, with the turret and its associated operating mechanism in the forward, or operative, position shown in Figure 4, as the main cam 9 acts on the roller 9a on the carrier 8 to effect rearward reciprocation of the latter, and after the locking pin 26 has been withdrawn in the initial stages of this rearward movement (by the cooperation of the bell-crank lever 30 with the cam 33, which is then held stationary), it will be apparent that when the collar 61 strikes the abutment face 63 on the bracket 60, the toothed sector 52 will be stopped, in such manner that as the carriage 8 moves further rearwardly, the gear 50 will be moved in a clockwise direction. Accordingly, through the connection of this gear to the clutch element 57 by the roller 48, a clockwise rotation of the turret 17 will be effected toward the next operative position thereof; the parts being shown in Figure 5 approaching this next operative position and with the pin 26 just about to drop into the next notch 25 and it being understood that the pin will drop into this notch as the carrier 8 completes its rearward movement with the indexing gear 50 traveling over the then relatively stationary sector 52. Moreover, when the direction of movement of the carrier 8 is reversed by the cam 9 and roller 9a and the carrier 8 begins to move forward, the collar 62 will strike the abutment face 64 on the member 60, and the roller 48 of the clutch mechanism will be released to disconnect the elements 47 and 50 and the gear 50 will accordingly rotate freely relative to its shaft 18 and to the turret 17 until the indexing mechanism is returned to its forward, or operative, position shown in Figure 4.

Cooperating with the above described mechanisms is also improved mechanism for timing the operation of the feeding and gripping mechanism 2, the transverse tool slide mechanism 3, and vertical cut off tool slide mechanisms 4, with the longitudinal tool carrier 8, whereby, after two forward reciprocations of the tool carrier 8 and while the third turret tool is operating on the work, the latter is formed by the tools on the slide 3 and after the completion of the work of the fourth turret tool, is cut off by the tools on slides 4, whereupon new lengths of stock are fed forward to be operated on in the next cycle of the machine. Herein, this mechanism includes a clutch controlling the connection of adjacent parts 66, 66a of the middle tubular shafting, which operates the feeding and gripping, transverse tool slide, and cutting off mechanisms; while the stock rotating mechanism continues to be operated by the central shaft 67 and the outer tubular shaft 14 continues to be oscillated by its roller 13 and cam 15 relative to shaft 66 to swing the stock stop 5. As shown, a sleeve 68 is keyed for reciprocation on one part 66 of the tubular shaft and a sleeve 69 is suitably fixed to the other part 66 of the tubular shaft. Suitable cooperating teeth 70, 70a are also provided on adjacent portions of the sleeves 68 and 69, and a clutch shipper 71 is carried on the sleeve 68 and shifts the latter longitudinally as desired to effect the connection or disconnection of these clutch teeth. An operating member 72 for this shipper is also carried on two uprights 73 pivoted at their lower ends on a transverse axis, as at 74, on the stationary bed frame, so that as these uprights 73 are moved about their pivots 74, the clutch teeth 70, 70a are connected or disconnected. Herein also an arm 75 extends rearwardly from the shipper operating member 72 and has a roller 76 on its rear end received in a suitable cam track 77 in a rotating cam 78. The cam track 77 also has an offset 79 thereon of such length that the sleeve 68 is pulled forwardly to connect the clutch teeth 70, 70a and thereby render the gripping and feeding mechanism 2, transverse tool slide mechanism 3, and vertical cut off mechanism 4 operative during only the operation of the last two tools. At the beginning of the operation of the third turret tool, the cam 78 begins to be operative as a result of its connection to a slotted spider 80 of a Geneva movement which is adapted to receive and cooperate with a projecting pin 81 fixed to and rotatable with the cam 9 and disposed over a cut away portion 82 in the front edge of that cam. This pin 81 being receivable successively in the slots 83 in the spider 80 and the slotted extremities of the member 80 being movable along the pin in the cut away portion 82, rotation of the cam 9 will thus rotate the member 80 and the cam 78 so that the roller 76 actuating the clutch shipper will move into the offset portion 79 on the cam 78 during the operation of the third turret tool. As a result, the sleeve 68 is reciprocated to connect the clutch teeth 70, 70a and cause rotation of the forward portion 66 of the tubular drive shaft to effect operation of the cross slide 3 to form the work while the fourth tool on the turrets is operating on the work in the spindles 1, and the cutting off tools 4 will be thereafter automatically operated to cut off the work, and the feeding and gripping mechanism 2 and the stock stop 5 will thereafter be operated to feed and stop the next length of stock ready for the cycle to be repeated.

Figure 4:
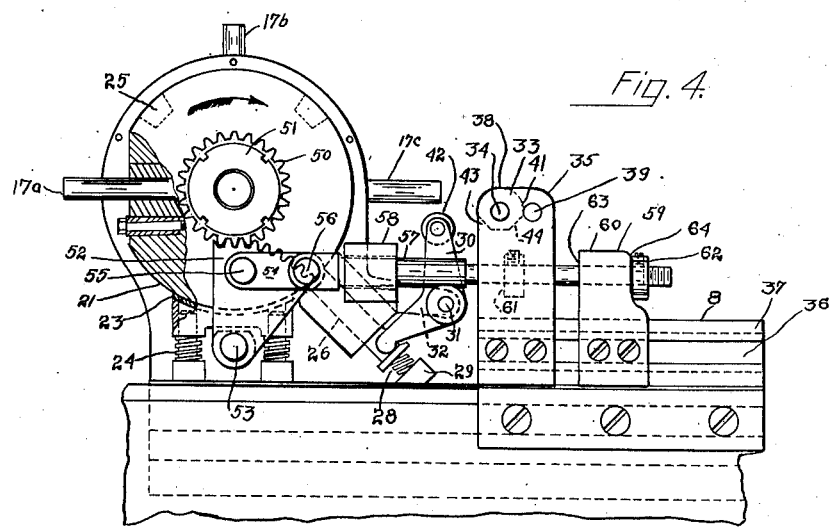
Fig. 4 is an enlarged detail side elevational view of the indexing mechanism shown in Figure 1, but at the forward limit of its travel, certain parts also being shown in section.

In the operation of the complete machine, it will be understood that each turret 17 occupies the position shown in Figure 4 as it moves forward with the carrier 8 to operate on the work in spindles 1; the turrets then being held in this operative position by their locking pins 26. When the carrier 8 moves rearward, each locking pin 26 is first released through cooperation of its bell crank 30 with its cam 33, and thereafter when the collars 61 strike the abutments 63, the turrets 17 are indexed in a clockwise direction to present their next adjacent tools as these indexing gears 50 move over the toothed sectors 52, the clutch elements 47, 50 then being connected and the turrets passing through the positions shown in Figure 5 and completing their movement of 90° and being automatically locked by the pins 26 as the carrier 8 completes its rearward movement. As the carrier 8 thereafter again moves forward, when the stop 62 strikes the abutment face 64, the clutch elements 47 and 50 are automatically released in such manner as to permit the return of the sectors 52 and indexing gears 50 to their initial positions while the turrets remain locked. During the first two cycles of the carrier 8, i. e., while the first two tools are operating, the stock feeding and gripping mechanism 2, transverse slide 3 and cut off slides 4 remain stationary; the clutch teeth 70, 70a then being disconnected. However, at the beginning of the operation of the third tools, i. e., as the carrier 8 moves forward for the third time, the cam 78 operates upon the clutch shipper mechanism 71 to connect the clutch teeth 70, 70a, whereupon the transverse tool slide 3 begins its movement to form the work gripped in the spindles 1 and this movement of the slide 3 is followed by the operation of the cut off slides 4 in usual sequence therewith and in timed relation to the carrier 8 so that the work is cut off following the completion of the operation of the fourth turret tools. As the turret thereafter moves rearward, it is again indexed to present the first tools and as the carrier makes this last stroke, the work feeding and gripping mechanism 2 is operated in its usual sequence with the transverse tool slides 3 and vertical cut off slides 4 so that stock is advanced in the spindles 1 to present new work to the first tools in the turrets. Further, it will be understood that as the carrier 8 moves forward, the stock stop arm 5 is automatically swung out of its stock stopping position before the first turret tools again come in contact with the new work; this stock stop being thus swung reversely each time that the carrier 8 moves forward and back, but performing no stock stopping function until the stock feeding and gripping mechanism 2 is operated in its sequence following the operation of the cut-off mechanisms 4.

In the operation of the machine, it will also be understood that the cam 9 makes one revolution for each complete reciprocation of the carrier 8 while the cam 78 is rotated through a quarter turn by each revolution of the drum. As a result, while the spindles are, as usual, rotated continuously, the transverse tool slide 3, cutting off tool slides 4, and feeding and gripping mechanisms 2 are operated only when the clutch teeth 70, 70a are connected, i. e., only during the last two complete reciprocations of the carrier 8, after remaining inoperative during the first two complete reciprocations of that carrier. Thus, the drum 9 not only controls the reciprocation of the carrier 8, but also, through the associated Geneva driven cam mechanism 78, controls the operation of the mechanisms 3, 4 and 2.

As a result of my improvements, it will be evident that the turrets 17 will be capable of performing as many operations on the work as there are tools carried by the turrets, thereby materially increasing the field of usefulness of a machine of this type, while the number of tools may be further increased to six or eight, if desired. Further, it will be noted that through my improved controlling mechanism, the operations of the feeding and gripping mechanisms 2 and forming and cutting off mechanisms 3 and 4 are so controlled and timed in an improved manner as to make this possible, these mechanisms being only operative after two tools on the turrets have completed their work. Thus, it is also made possible to apply my improvements to machines embodying such mechanism of standard form without change in these mechanisms. These and other advantages of my improvements will, however, be clearly apparent to those skilled in the art.

While I have in this application specifically described one embodiment which my invention may assume in practice, it will be understood that this form of the same has been shown for purposes of illustration, and that the invention may be modified and embodied in various other forms without departing from its spirit or the scope of the appended claims.

What I claim as new and desire to secure by Letters Patent is:

1. In a turret indexing mechanism, a turret rotatable on a transverse axis and carrying a plurality of tools, a reciprocable carrier on which said turret is journalled and movable in planes parallel to said axis, a bed frame on which said carrier is reciprocable, a constantly operative brake carried on said carrier and operating on said turret beneath the latter, locking mechanism carried on said carrier beneath said turret including a locking pin biased to locking position and received in said turret in different indexed positions thereof, and means for controlling said pin including a pin operating lever carried on said carrier and lever operating cam means carried on said bed frame.

2. In a turret indexing mechanism, a reciprocable carrier, a bed frame on which said carrier is reciprocable, a multi-tool carrying turret on said carrier, and turret indexing mechanism including a toothed sector carried by said carrier, a cooperating gear carried by said turret, and means for maintaining said sector against movement relative to said gear during a portion of the movement of said carrier in one direction to effect rotation of said turret to present a new tool in operative position.

3. In a turret indexing mechanism, a reciprocable carrier, a bed frame on which said carrier is reciprocable, a multi-tool carrying turret on said carrier, and turret indexing mechanism including a toothed sector carried by said carrier, a cooperating gear carried by said turret, means for maintaining said sector against movement relative to said gear during a portion of the movement of said carrier in one direction to effect rotation of said turret to present a new tool in operative position, and automatic clutch means between said gear and turret for enabling free movement of said sector in the opposite direction.

4. In a turret indexing mechanism, a reciprocable carrier, a bed frame on which said carrier is reciprocable, a multi-tool carrying turret on said carrier, and turret indexing mechanism including a toothed sector carried by said carrier, a cooperating gear carried by said turret, and means for maintaining said sector against movement relative to said gear during a portion of the movement of said carrier in one direction to effect rotation of said turret to present a new tool in operative position, including cooperating stationary and movable stops on said bed frame and sector.

5. In a turret indexing mechanism, a reciprocable carrier, a bed frame on which said carrier is reciprocable, a multi-tool carrying turret on said carrier, and turret indexing mechanism including a toothed sector carried by said carrier, a cooperating gear carried by said turret, and means for maintaining said sector against movement relative to said gear during reciprocation of said carrier to effect rotation of said turret to present a new tool in operative position, including a rod extending rearwardly from said sector, a guide therefor carried on said bed frame, and cooperating stop means on said rod and guide.

6. In a turret indexing mechanism, a reciprocable carrier, a bed frame on which said carrier is reciprocable, a multi-tool carrying turret on said carrier, and turret indexing mechanism including a toothed sector carried by said carrier, a cooperating gear carried by said turret, means for maintaining said sector against movement relative to said gear during a portion of the rearward movement of said carrier to effect rotation of said turret to present a new tool in operative position, and clutch means between said gear and turret for enabling free rotation of said gear relative to said turret while said carrier moves toward the work.

RAYMOND L. KUEHN.